No. 745,336. Patented December 1, 1903.

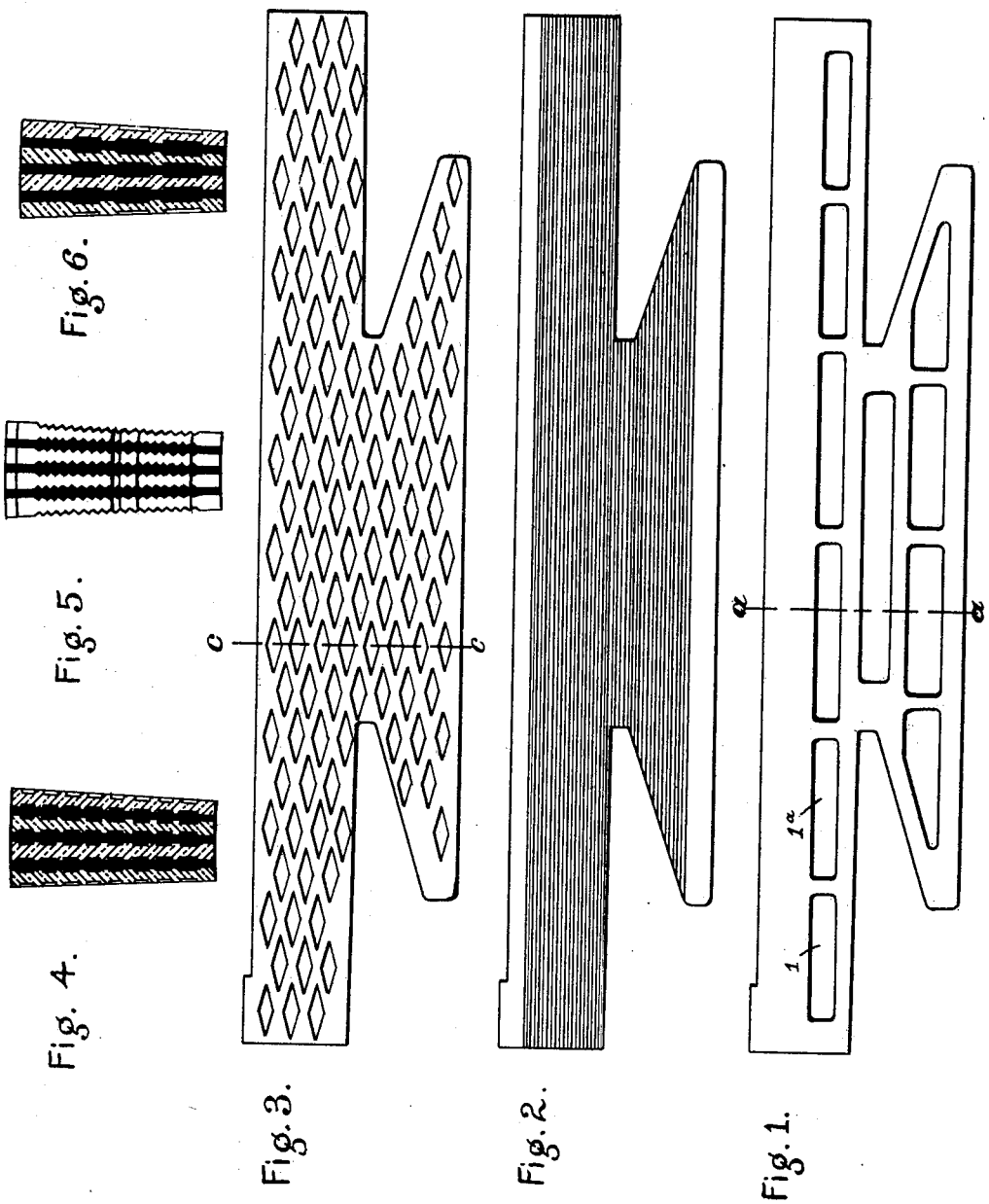

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

COMMUTATOR-BAR.

SPECIFICATION forming part of Letters Patent No. 745,336, dated December 1, 1903.

Application filed May 10, 1900. Serial No. 16,155. (No model.)

*To all whom it may concern:*

Be it known that I, WILLIAM LE R. EMMET, a citizen of the United States, residing at Schenectady, county of Schenectady, State of New York, have invented certain new and useful Improvements in Commutator-Bars, of which the following is a specification.

The object of this invention is to prevent relative motion of commutator-bars and an uneven surface or tread of the brushes resulting therefrom.

In carrying out the invention I provide the commutator-bar on its lateral faces which abut against the faces of the adjacent bars with a roughened, knurled, pitted, or indented surface, which under the pressure of the bars in assembling bites into the insulating material and locks the several bars into a compact whole, preventing under the centrifugal and other strains to which the bars are subjected any relative radial motion. I prefer to form this roughened surface by running the bar between rollers having suitable projections on the surfaces which produce the desired indentations, the excess of metal displaced in producing the pits or indentations being distributed and flattened off, if desired, to correct dimensions by a final shaping process, preferably by drawing the bar through a die. It is, however, not essential to produce the roughnesses by rollers, as irregularities in the lateral faces may be produced by pressing, scoring, or otherwise indenting them. I prefer to use an adhesive varnish between the surfaces of the bars and of the insulating material. This varnish after having been hardened by baking glues the insulation securely to the bars, and thus tends to prevent relative motion of the bars or insulation-pieces. Where the bars are scored or indented, the depressions are filled by the varnish, and thus the strength of the bond between the bars and the varnish is increased. The expansion of the parts under heat or pressure also tends to make the insulating material expand into the depressions, and thus forms a bond which prevents relative motion.

The novel features of my invention will be more specifically pointed out hereinafter and will be definitely indicated in the claims appended to this specification.

In the accompanying drawings, which illustrate the invention, Figure 1 is a side elevation of a commutator-bar embodying my improvements. Figs. 2 and 3 are similar views of modified plans of roughening the lateral faces; and Figs. 4, 5, and 6 represent assembled a plurality of commutator-bars such as indicated in Figs. 3, 2, and 1, respectively, the rugosities in all of the figures being exaggerated for the purpose of better illustrating the invention, Fig. 4 being a section on line $c\,c$ of Fig. 3, and Fig. 6 a section on line $a\,a$ of Fig. 1.

The commutator-bar shown in the drawings is one of special type; but my invention is not limited to any particular form.

The essential feature of my invention is in providing the faces with roughnesses, which prevent one bar from slipping on its neighbor.

The form shown in Fig. 1 is provided with a plurality of rectangular pits, as indicated at 1 1$^a$, &c., which should for the best result be distributed over the bulk of the sides of the bar. The bars may be roughly shaped by casting or otherwise, and they may be upset cold in a die, which brings them to accurate prismatic dimensions without machining and which may also serve to correct their form in other respects. As hereinbefore stated, accuracy of dimension is only imperative in respect of the elevated surfaces, which being relatively small in area are easily upset, the surplus metal being forced away from the elevated portions and tending to fill up the depressions. My plan of construction effects considerable economy in cases where cast bars can advantageously be used in the manufacture of commutators, since it affords means by which the bars can be brought to accurate dimensions without machining.

In Fig. 2 I have shown a type of roughening in which parallel grooves are formed along the sides of the bar. This result might be effected by scoring or rolling.

In Fig. 3 I have shown the face of the bar as provided with a number of diamond-shaped pits. The size of these is exaggerated for the purpose of illustration, as, in fact, they might be quite small while still promoting all the results aimed at by my invention. Thus the bars are held from relative displacement by adhesion of the varnish, gum, or other suitable yielding material and by the walls of the depressions into which it and the insulating material are squeezed.

What I claim as new, and desire to secure by Letters Patent of the United States, is—

1. A commutator consisting of metal bars and insulating material, the bars having indentations on the lateral faces and being spaced apart by insulation only so that the projecting parts of one bar do not overhang those of another in a radial plane whereby movement of one bar relative to another is prevented by the insulation.

2. A commutator-bar having its lateral faces roughened to permit it to be locked against radial thrust.

3. A commutator composed of a plurality of bars having on their lateral faces projections or roughnesses squeezed into firm engagement with an insulating material between the successive bars.

4. A commutator-bar having a roughened surface on its side walls.

5. A commutator-bar of cast metal provided with indented roughened sides.

6. A commutator having its several bars roughened and locked against displacement by adhesive insulation over its entire surface.

7. A commutator having its several bars roughened on their sides and connected together by adhesive insulation.

8. A commutator having its several bars connected together by adhesive varnish baked hard.

9. A commutator having its several bars provided with roughened or indented surfaces connected by adhesive insulating material.

10. A commutator having its bars indented on adjacent sides, the indentations being connected by plane surfaces finished to accurate prismatic dimensions.

11. A commutator having its bars provided on their lateral faces with depressions into which the insulating material between the bars may expand under heat and pressure.

12. A commutator having its several bars connected to the insulation by adhesive material.

13. A commutator having its several bars connected to the insulation by adhesive varnish baked hard.

In witness whereof I have hereunto set my hand this 8th day of May, 1900.

WILLIAM L. R. EMMET.

Witnesses:
BENJAMIN B. HULL,
EDWARD WILLIAMS, Jr.